United States Patent [19]

Takada

[11] 4,334,701
[45] Jun. 15, 1982

[54] COUPLING FOR A VEHICLE SEAT BELT

[76] Inventor: Juichiro Takada, 3-12-1, Shinmachi Setagayaku, Tokyo, Japan, 105

[21] Appl. No.: 137,735

[22] Filed: Apr. 7, 1980

[30] Foreign Application Priority Data

Apr. 11, 1979 [JP] Japan .......................... 54-046846[U]
Aug. 27, 1979 [JP] Japan .......................... 54-116788[U]

[51] Int. Cl.³ .............................................. A62B 35/02
[52] U.S. Cl. ..................................... 280/804; 297/483
[58] Field of Search ...................... 280/802, 804, 808; 297/483, 485, 469

[56] References Cited

U.S. PATENT DOCUMENTS

| 3,790,209 | 2/1974 | Littmann | 297/483 |
| 3,845,524 | 11/1974 | Hull et al. | 297/483 |
| 3,885,811 | 5/1975 | Takada | 297/483 |
| 3,897,963 | 8/1975 | Seiffert et al. | 280/802 |
| 3,927,902 | 12/1975 | Lindblad | 280/804 |
| 4,061,365 | 12/1977 | Nagano et al. | 280/804 |
| 4,238,129 | 12/1980 | Yasumatsu | 280/802 |

FOREIGN PATENT DOCUMENTS 54-149130 11/1979 Japan .................................. 280/804

Primary Examiner—Joseph F. Peters, Jr.
Assistant Examiner—Ross Weaver
Attorney, Agent, or Firm—Brumbaugh, Graves, Donohue & Raymond

[57] ABSTRACT

A coupling arrangement for connecting the outboard end of a passive seat or shoulder belt to a fixed or movable anchor on the vehicle door or the body near the door comprises a plate connected to the anchor, a plate connected to the belt, a pin on one of the plates, a key-type hole on the other plate and a resilient retainer which retains the pin in a smaller part of the slot and prevents manual release of the coupling.

7 Claims, 10 Drawing Figures

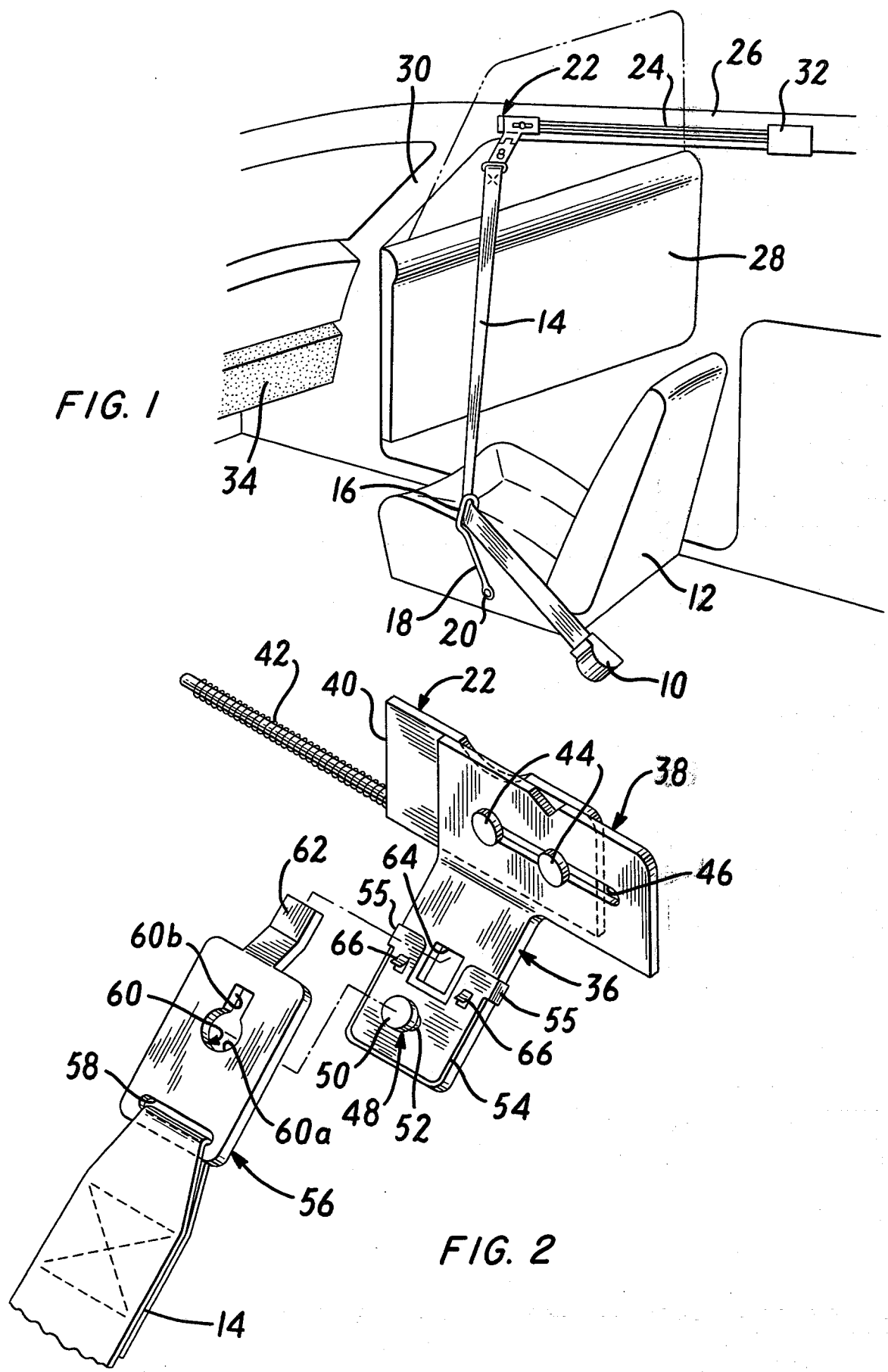

COUPLING FOR A VEHICLE SEAT BELT

FIELD OF THE INVENTION

The present invention relates to a coupling for connecting the outboard end of a seat belt to an anchor on the vehicle door or on the vehicle body adjacent the door.

BACKGROUND OF THE INVENTION

There are various passive vehicle seat belt systems in which an occupant restraint belt leads outwardly from a retractor affixed adjacent the lower rear of the inboard side of the seat to an anchor located on the outboard side of the seat. An anchor may, in the case of shoulder belts, be a fixed anchor fastened to the upper rear corner of the vehicle door, in which case the belt shifts forward away from the occupant to a releasing position when the door is opened. A fixed anchor may also be attached to the vehicle body above and behind the occupant's shoulder, and a mechanically or electrically drive transfer guide ring is moved along a track affixed at the edge of the roof above the door between a restraint location near the anchor and a release location near or along the front pillar of the vehicle. Instead of a fixed anchor and a transfer ring, the outboard end of a shoulder belt can be connected to a movable anchor carried by a track above the vehicle door. In the case of a lap belt, the outboard end of the belt is attached to a fixed anchor on the lower rear portion of the door and a portion of the belt is transferred by a guide ring that moves along a track of the door. Alternatively, the lap belt may be transferred between a restraining location near the lower rear corner of the door to a releasing location near the front of the door by a mechanically or electrically driven moving anchor. Various specific designs of all of the above arrangements are known in the prior art.

Many systems of the types described above present problems during assembly of the vehicle when it is being manufactured on the conventional vehicle assembly line, inasmuch as it is often necessary for the guide rails and other components of the restraint system to be installed before the inner panels and coverings on the roof or door are installed. If the belt is already partly or fully assembled to the guides and anchors, it can interfere with the installation of linings and coverings as well as with other assembly procedures within the passenger compartment.

Some specific belt systems have a buckle for connecting the outboard end of the belt to the vehicle door or body. Such a buckle allows the installation of anchors, guide rails and other components of the system while the belt remains unattached to the outboard part of the vehicle and wound conveniently out of the way on the retractor. The buckle also serves as an emergency release device that is accessible from outside the vehicle and can be disconnected by someone coming to the assistance of an injured or trapped occupant in case the occupant is to be removed from the vehicle and, for one reason or another, the normal function of the passive belt system is prevented. Of course, the occupant may also have to release himself from the belt in some situations.

Despite the advantages of a buckle for connecting the outboard end of a lap or shoulder belt to a fixed or moving anchor, such a buckle has the disadvantage of being subject to being released by an occupant who does not wish to wear the belt, even though an important reason for having a passive belt system in a vehicle is to encourage an occupant to wear the belt by eliminating the inconvenience of connecting and disconnecting it. Moreover, a child might disconnect the belt and be endangered, and the driver may not be able to reconnect the belt or if he tries to do so, will be distracted from operating the vehicle. Ordinarily the buckle is attached to the anchor and the buckle tongue is on the belt, and the buckle, because it is of comparatively large size, can be a hazard to the occupant. In the case of moving anchors, the buckle increases the weight and therefore the driving force required to move the anchor between the releasing and restraining locations.

SUMMARY OF THE INVENTION

There is provided, in accordance with the present invention, a coupling for connecting a lap or shoulder belt to a fixed or moving anchor located outboard of the seat either on the door or the vehicle body near the door which enables the belt of a passive belt system to be quickly and easily connected but prevents the belt from being manually disconnected from the anchor. The coupling comprises a first plate connected to the anchor, a second plate connected to the belt, a releasable coupling arrangement for connecting the two plates to each other and a retainer device associated with the coupling for preventing manual release of the coupling device. Preferably, the retainer device includes a resilient element which is deflected at the time that the plates are initially connected to each other but which normally blocks the coupling device in the coupled state.

Preferably, the coupling device by which the two plates are connected includes a pin that projects from one of the plates and has a head portion and a shank portion that is smaller in at least one dimension than the head portion. The pin is received in a key-type hole in the other plate, the hole including a larger portion through which the head of the pin can pass and a smaller portion which accepts the shank of the pin but through which the head cannot pass.

The retainer may be a leaf spring affixed to one of the plates which normally resides in a position in which a portion thereof blocks movement of the plates relative to each other away from a position in which the shank of the pin is retained in the smaller portion of the hole. In one embodiment, the leaf spring is on the plate which has the pin and includes a pair of resiliently deflectable tangs which engage an edge of the other plate to prevent such movement but which deflect to enable the plates to be coupled initially. In another embodiment, the leaf spring is on the plate which has the hole and includes a portion which normally overlies at least part of the larger portion of the hole, thus to block relative movement of the plates, but which resiliently deflects to allow the head of the pin to pass entirely through the plate when the plates are initially coupled. Advantageously, the plate to which the belt is fastened is pivotable about the axis of the pin for self-positioning of the belt to fit the user properly, in which case it may also be desirable to limit the degree of pivotal movement by means of a projection on one of the plates which is received in an arcuate guide slot on the other plate. When the leaf spring is on the plate on the end of the belt, it may include a portion that is received and held in place between segments of a loop on the end portion of the belt by which the belt is joined to the plate so that twisting of the end portion of the belt is prevented.

For a better understanding of the invention, reference may be made to the following description of an exemplary embodiment, taken in conjunction with the figures of the accompanying drawings.

DESCRIPTION OF THE DRAWINGS

FIG. 1 is a pictorial view of a passive belt system which includes a coupling arrangement embodying the present invention;

FIG. 2 is a pictorial view of one embodiment of the coupling arrangement in the uncoupled state;

DESCRIPTION OF EXEMPLARY EMBODIMENTS

Figure 3:
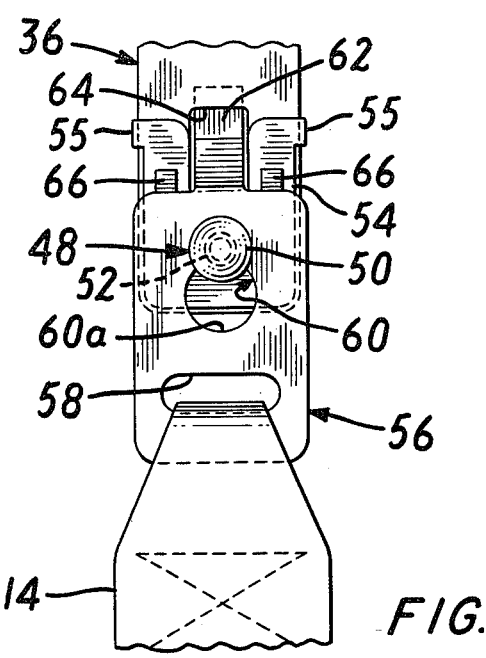
FIG. 3 is a plan view of the coupling arrangement shown in FIG. 2, shown as connected.

The passive restraint system shown in FIG. 1 comprises a belt retractor 10 affixed to the vehicle floor adjacent the lower rear and on the inboard side of the vehicle seat 12. A shoulder belt 14 leads from the retractor through a guide ring 16 at the upper end of an arm 18 which pivots about a pivot pin 20 on the side of the seat by means of a suitable electrical or mechanical transfer device (not shown) in response to opening and closing movements of the door. Exemplary devices for pivoting the arm 18 are described and shown in the present inventor's U.S. Appln. Ser. No. 118,841 filed Feb. 5, 1980, for "Belt Transfer Arrangement for a Passive Vehicle Restraint Belt System." The belt 14 then extends upwardly and outwardly across the seat to a movable anchor 22 that slides along a guide rail 24 affixed along the edge of the vehicle roof 26 above the door 28.

The movable anchor 22 is driven by a suitable electrical or mechanical drive arrangement (not shown) in response to opening and closing motions of the door 28 between a position near the front pillar 30 of the vehicle body and a location above and behind the occupant. In the forward positions of the anchor 22 and the guide ring 16, the belt 14 is pulled forward to a position which enables an occupant to enter or leave the seat without hindrance by the belt. When the door 28 is closed, the drive devices for the anchor 22 and ring 16 move them to rearward locations in which the belt passes diagonally along the occupant's torso and over his or her shoulder for safe restraint of the occupant. In the restraint configuration, the moving anchor 22 is located in position at the rear end of the track 24 by a latching mechanism 32. The vehicle restraint system shown in FIG. 1 also includes an energy-absorbing knee pad 34 located in front of the seat under the dashboard. Except for the coupling by which the outboard end of the belt 14 is connected to the moving anchor 22, the belt system shown in FIG. 1 is not part of the present invention and is merely exemplary of a system in which the coupling arrangement for connecting the outboard end of a restraint belt to a fixed or moving anchor can be used.

Figure 4:
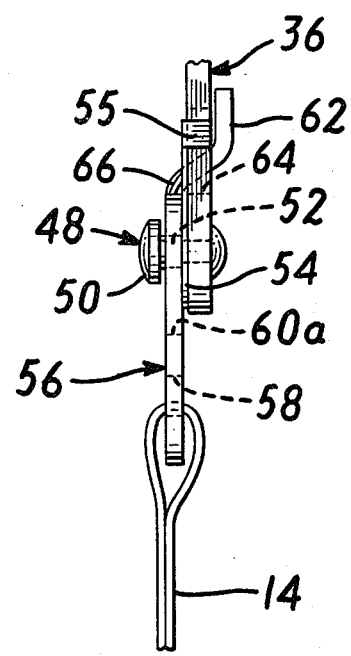
FIG. 4 is a side view of the coupling arrangement shown in FIGS. 2 and 3.
Figure 5:
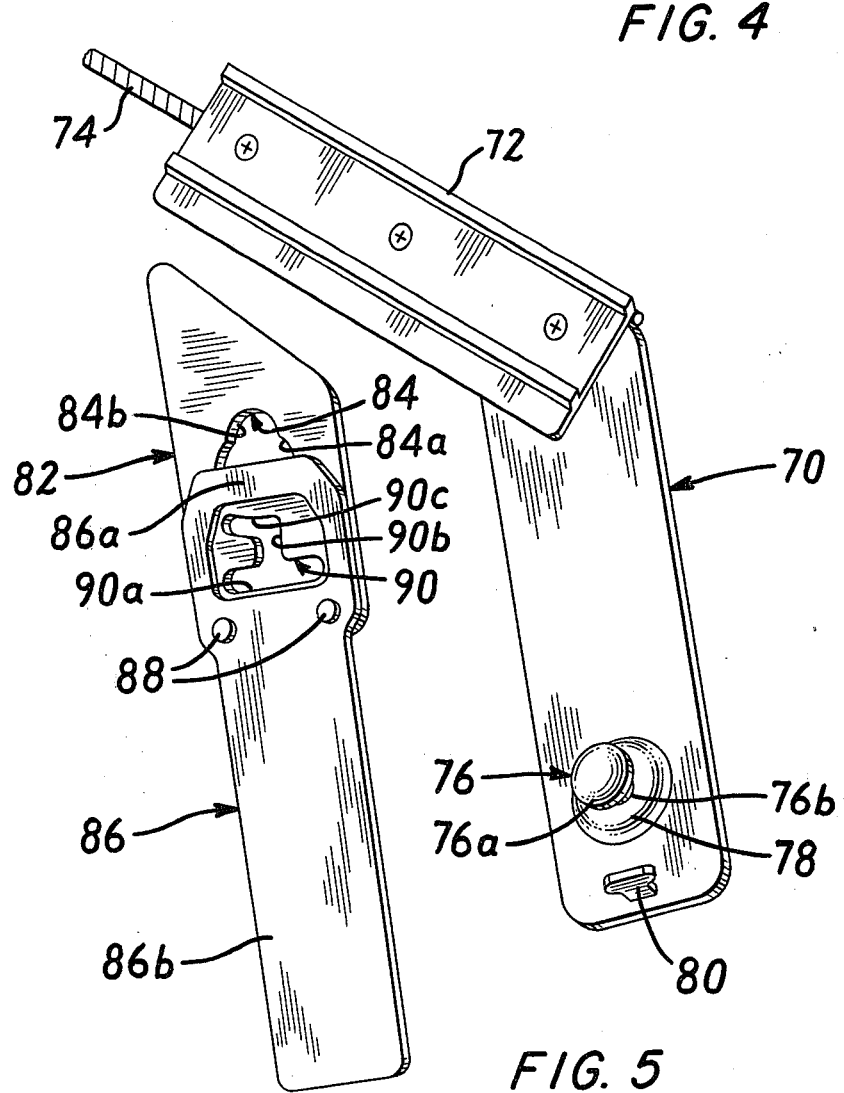
FIG. 5 is an exploded pictorial view of another embodiment of the present invention.

The coupling arrangement shown in FIGS. 2 to 4 of the drawings comprises a plate 36 which is unitary with one component 38 of the moving anchor 22. The anchor 22 shown in FIG. 2 includes a cam member 40 that is fastened to the end of a racked wire 42 and is coupled to the component 38 by pins 44 on the cam member 40 that slide along a slot 46 in the component 38. The lost motion afforded by the pins 44 and slots 46 is part of a latching mechanism that is not part of the present invention and will not, therefore, be further described.

The plate 36 on the moving anchor 22 carries an outwardly projecting pin 48 which has a head portion 50 and a shank portion 52 of a substantially lesser diameter than that of the head portion 50. The pin 48 clamps a leaf spring 54 onto the plate, and a pair of bent tabs 55 on the leaf spring 54 engage the sides of the plates 36.

A second plate 56 is attached to the outboard end of the belt 14 by passing the belt through a slot 58 in the plate and looping a short length of the belt back on itself and sewing the end of the loop to the incoming side of the belt. The plate 56 has a key-type hole 60 having a larger portion 60a through which the head of the pin 48 can pass and a smaller portion 60b which accepts the shank 52 of the pin but will not allow the head 50 to pass. A bent lug 62 extends from the upper end of the plate 56.

The coupling arrangement shown in FIGS. 2 to 4 is assembled by first positioning the two plates somewhat oblique to each other and inserting the lug 62 into a corresponding hole 64 in the other plate 36. The plate 56 is then pushed toward the plate 36 with the pin 48 aligned with the hole 60. In such a relative position of the two plates, the upper end of the plate 56 overlies two small tangs 66 that bend slightly out from the leaf spring 54. When the plate 56 is pushed toward the plate 36, the lug 62 acts as a fulcrum for applying leverage to the plate 56 to faciliate resilient deformation of the tangs 66 toward the outer face of the plate 36. Accordingly, the plate 56 can be pushed toward the plate 36 sufficiently to allow the head 50 of the pin 48 to pass entirely through the hole 60, and next the plate 56 can be pulled down so that the shank 52 of the pin is accepted into the smaller portion 60b of the hole 60. Thereupon, the tangs 66 spring back and engage the upper edge of the plate 56 from moving upwardly. Accordingly, once the coupling has been assembled, the tangs on the leaf spring prevent the coupling from being disconnected by preventing relative movement of the two plates in a manner in which the head 50 of the pin 48 can pass through the larger portion 60a of the hole 60.

In the embodiment shown in FIGS. 5 to 8, one plate 70 of the coupling is fastened to a moving anchor 72 that is driven by a drive wire 74. A coupling pin 76 having a head portion 76a and a shank portion 76b of smaller diameter than the head portion extends out from a small raised boss 78 on the front of the plate 70. A generally T-shaped projection 80 extends up from the front of the plate 70 near the lower edge.

The other plate 82 of the coupling is fastened to the outboard end of the belt (as described below) and has a key-type hole 84 having a larger portion 84a through which the head portion 76a of the pin can pass and a smaller portion 84b which accepts the shank portion 76b of the pin but through which the head portion of the pin cannot pass. A leaf spring 86 is fastened by rivets 88 to the plate 82 and includes a blocking portion 86a which overlies part of the larger portion 84a of the hole 84. A T-shaped slot 90 in the plate 82 receives the projection 80 on the plate 70. The leaf spring 86 has a cut-out generally around the boundary of the slot.

Figures 6A, 6B, 7:
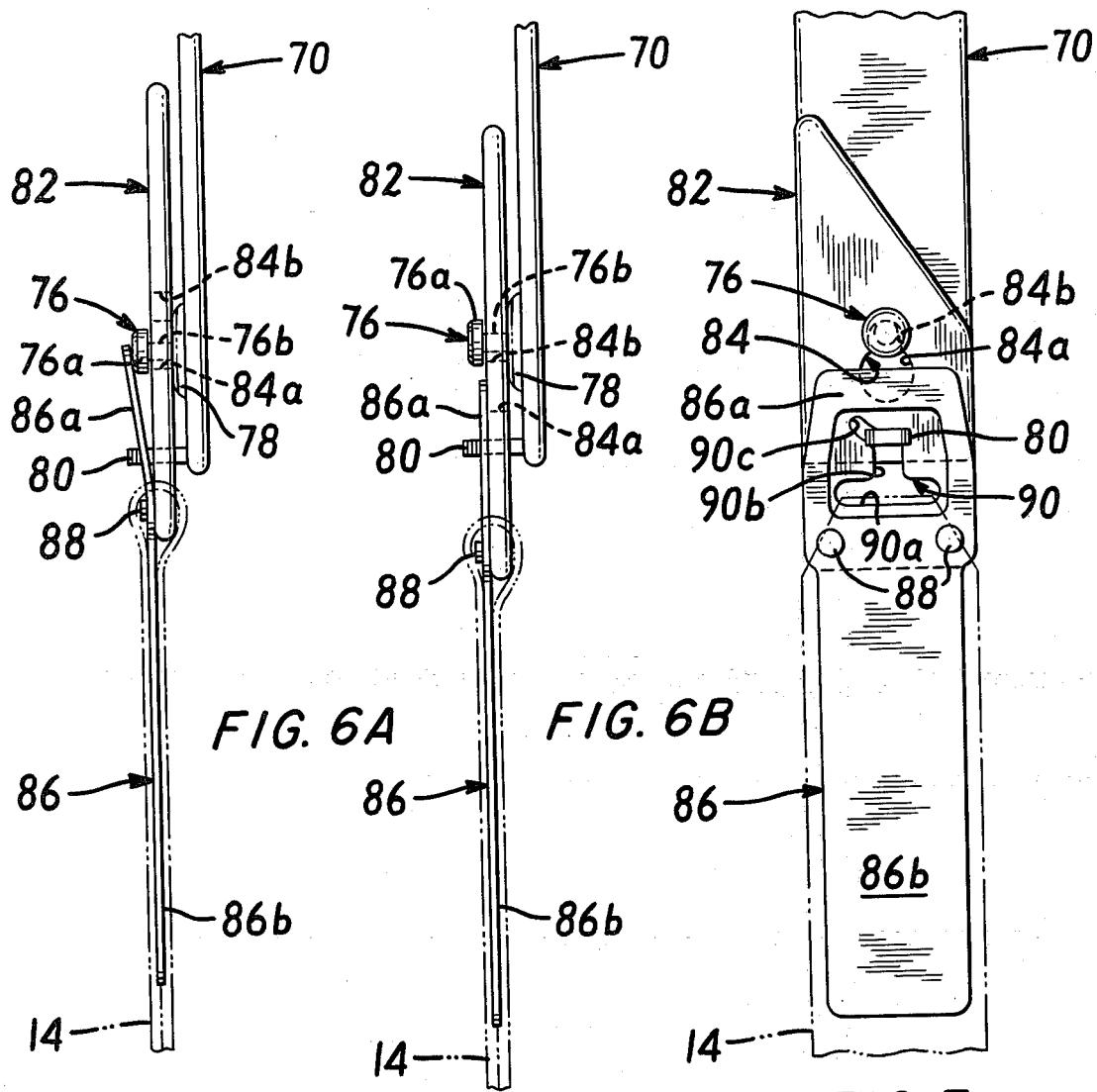
FIG. 6A is a side view of the embodiment of FIG. 5, showing it during the initial part of the assembly procedure.
FIG. 6B is a side view of the embodiment of FIG. 5, showing it fully connected up.
FIG. 7 is a plan view of the embodiment of FIGS. 5 and 6.

The coupling arrangement shown in FIGS. 5 to 8 is connected up by positioning the plate 82 on the end of the belt with the hole 84 in register with the pin 76 and the sot 90 in register with the projection 80 and then pushing the plate 82 toward the plate 70 to attain the position illustrated in FIG. 6A. The head portion 76a of the pin 76 deflects the portion 86a of the leaf spring. When the head portion of the pin clears the outer face of the plate 82, the plate 82 can be pulled down to locate the shank portion 76b of the pin in the smaller portion 84b of the hole 84. Meanwhile, the projection 80, which had passed through the lower cross portion 90a of the slot 90 (see FIG. 6A), moves through the longitudinal portion 90b on the slot into an arcuate guide portion 90c. The leaf spring 86 springs back to lie flat against the face 82 as soon as the plate 82 moves down far enough for the spring to clear the head of the pin 76. Once that position is attained, see FIGS. 6B and 7, the plate 82 cannot move back up, relative to the plate 70, far enough for the head portion 76a of the pin to register with and pass through the larger portion 84a of the hole 84. Once the coupling is connected up, the plate 82 on the belt can pivot about the shank of the pin, but only to the extent permitted by the arcuate guide slot portion 90c, the ends of which engage the shank of the projection 80 on the plate 70 and limit rotation in each direction.

Figure 8:
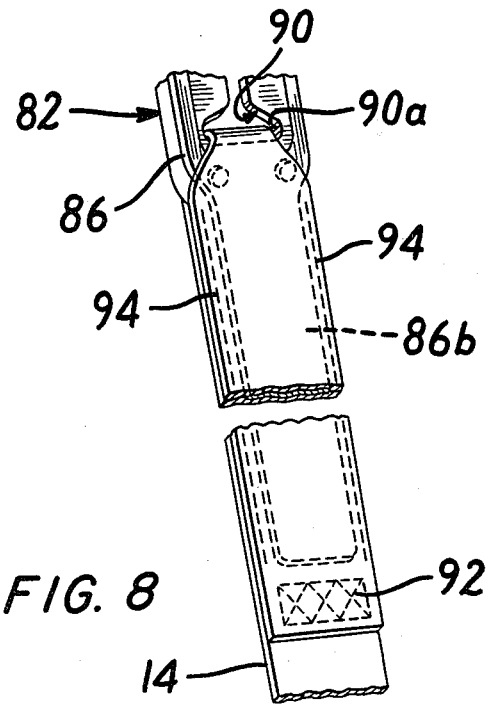
FIG. 8 is a partial pictorial view of the embodiments of FIGS. 5 through 7.

As shown in FIG. 8, the belt 14 is connected to the plate 82 by passing the end through the lower cross portion 90a of the slot 90, folding the end portion back along the incoming segment of the belt and sewing the end to the incoming portion by stitching 92. The leaf spring 86 includes a portion 86b that extends some distance down along the loop formed at the end of the belt. Both sides of the belt loop on either side of the spring portion 86b are sewn together by stitching 94. The spring portion 86b keeps the belt from twisting.

Figure 9:
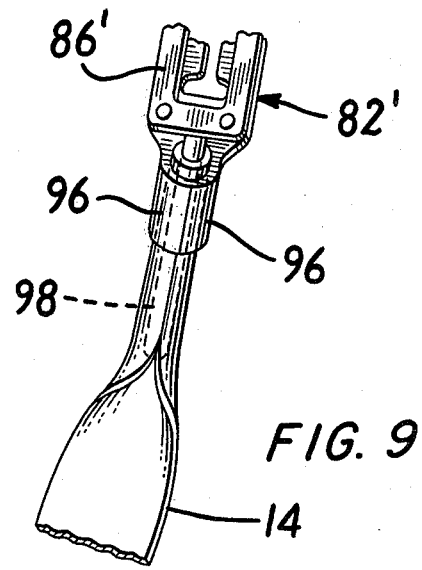
FIG. 9 is a partial pictorial view showing another way of connecting the belt to a plate similar to the embodiment of FIGS. 5 to 8.

As illustrated in FIG. 9, the belt 14 can also be attached to a plate 82' (similar to the plate 82) by curling the end portion and clamping the curled end portion within a pair of lugs 96 formed on the lower end of the plate 82 and squeezed around the end of the belt between dies under high pressure. The leaf spring 86' does not include a lower portion that extends into the belt. A U-shaped wire spring 98 received within the curled end portion of the belt helps position the belt for proper fitting to the occupant. The fastening arrangement shown in FIG. 9 is of smaller size and does not interfere as much with the vision of the vehicle occupants.

In each of the embodiments, it is desirable to provide a flexible plastic covering around the coupling arrangement to improve the appearance and protect the occupant from coming into contact with the metal parts.

Thus, the present invention provides a coupling arrangement of small size and weight, of simple construction and of reliable operation. The most important advantage is that once the coupling is connected up, it cannot readily be undone manually but can only be undone by using some sort of tool to pry the blocking spring into a position that will allow the pin to pass back through the key-type hole. The coupling arrangement permits the belt to remain uncoupled from the outboard anchor during assembly of the outboard components of the belt system to the vehicle and the installation of interior panels and coverings and other assembly work within the vehicle. Meanwhile, the belt can be kept between the vehicle seats where it is out of the way. The belt can be connected to the anchor by means of the coupling arrangement as one of the final assembly stages and can even be left undone and finally done up by the dealer before the vehicle is delivered to the purchaser. The coupling arrangements are easy to connect up.

The spring arrangements within the outboard end portion of the belt, as shown in FIGS. 8 and 9, assist in holding the belt in a proper configuration over the occupant's shoulder; the belt cannot readily engage the occupant's neck and thereby present a possible hazard. The springs also reduce the tendency for the belts to twist, but the elasticity of the spring (either the leaf spring or U-shaped wire) enables the end of the belt to bend and readily lead over the occupant's shoulder in a manner that is comfortable to occupants of various physiques.

The coupling arrangement, in accordance with the invention, can be used with various anchors located at various places outboard of the seat and is not limited to the moving anchor systems described above and shown in the drawings. The pins and holes that receive them and the location of the spring can be reversed as between the plate on the anchor and the plate on the belt. The above-described embodiments are, therefore, merely exemplary, and numerous variations and modifications can be made by those skilled in the art without departing from the spirit and scope of the invention.

I claim:

1. In a passive vehicle occupant restraint belt system which includes a belt leading from a retractor located inboard of the seat to an anchor outboard of the seat, a coupling arrangement for connecting the belt to the anchor comprising a first plate member connected to the anchor, a second plate member connected to the belt, releasable coupling means for coupling the first and second plates and including a pin projecting from one of the plates and having a head portion and a shank portion that is smaller in at least one dimension than the head portion and a key-type hole in the other plate that includes a larger portion through which the head portion can pass and a smaller portion which accepts the shank portion but through which the head portion cannot pass, and retainer means for blocking the pin in the smaller portion of the hole and preventing manual release of the coupling means including a substantially flat spring member affixed substantially flatwise to one of the first and second plate members having a portion engageable with a portion of the other of the first and second plate members when the pin is accepted in the smaller portion of the hole.

2. A coupling according to claim 1 wherein the retainer means is a leaf spring affixed to one of the plates which normally resides in a position in which a portion thereof blocks movement of one plate relative to the other away from a position in which the shank portion of the pin is located in the smaller portion of the hole.

3. A coupling according to claim 2 wherein the leaf spring is on the plate which has the pin and includes a pair of resiliently deflectable tangs which engage an edge of the other plate to prevent such movement but which deflect to enable the plates to be coupled initially.

4. A coupling according to claim 2 wherein the leaf spring is on the plate which has the hole and includes a portion which normally overlies at least part of the larger portion of the hole to prevent such plate movement but which resiliently deflects for acceptance of the pin through such larger portion upon initial coupling of the plates.

5. A coupling according to claim 4 wherein the plate fastened to the belt is pivotable about the axis of the pin for self-positioning of the belt to fit the user properly.

6. A coupling according to claim 5 and further comprising means for limiting the amount of pivotal movement of the plate on the belt including a projection on one of the plates and an arcuate guide slot on the other plate which receives the projection.

7. A coupling according to claim 6 wherein the leaf spring includes a portion that is received and held in place between segments of a loop on the end portion of the belt by which the belt is joined to the plate, whereby any tendency for the belt to twist where it is joined to the plate is prevented.

* * * * *